US012570571B2

(12) United States Patent (10) Patent No.: US 12,570,571 B2
Yamamoto et al. (45) Date of Patent: Mar. 10, 2026

(54) GLASS

(71) Applicant: AGC Inc., Tokyo (JP)

(72) Inventors: Hiroyuki Yamamoto, Tokyo (JP);
Shuhei Ogawa, Tokyo (JP); **Seiji
Inaba**, Tokyo (JP)

(73) Assignee: AGC Inc., Tokyo (JP)

( * ) Notice: Subject to any disclaimer, the term of this
patent is extended or adjusted under 35
U.S.C. 154(b) by 210 days.

(21) Appl. No.: 18/063,129

(22) Filed: Dec. 8, 2022

(65) Prior Publication Data

US 2023/0103501 A1     Apr. 6, 2023

Related U.S. Application Data

(63) Continuation of application No. PCT/JP2021/021105,
filed on Jun. 2, 2021.

(30) Foreign Application Priority Data

Jun. 10, 2020    (JP) ................................. 2020-101051
Sep. 25, 2020    (JP) ................................. 2020-161312

(51) Int. Cl.
  *C03C 3/097* (2006.01)
  *B32B 17/06* (2006.01)
  *C03C 27/04* (2006.01)
  *C04B 37/04* (2006.01)
  *F24C 15/10* (2006.01)
  *H05B 6/12* (2006.01)
(52) U.S. Cl.
  CPC .............. *C03C 3/097* (2013.01); *B32B 17/06*
      (2013.01); *C04B 37/047* (2013.01); *C03C*
      *27/048* (2013.01); *F24C 15/102* (2013.01);
                        *H05B 6/1209* (2013.01)
(58) Field of Classification Search
  CPC ......... C03C 3/045; C03C 3/076; C03C 3/083;
          C03C 3/097; C03C 3/078; C03C 3/085;
          C03C 3/087; C03C 3/089; H05B 6/1209;
                                        F24C 15/10
  See application file for complete search history.

(56) References Cited

U.S. PATENT DOCUMENTS 5,562,774 A    10/1996  Breidenbach et al.
  11,958,269 B2   4/2024  Ogawa et al.

11,964,450 B2    4/2024   Ogawa et al.
  2004/0183232 A1  9/2004   Kinoshita et al.
  2008/0174054 A1  7/2008   Lipson et al.
  2010/0128242 A1  5/2010   Lipson et al.
  2013/0288876 A1  10/2013  Fujisawa et al.
  2016/0276544 A1  9/2016   Shiratori et al.
  2017/0157891 A1* 6/2017   Soda ...................... B32B 27/06
  2017/0284747 A1  10/2017  Miwa et al.
  2018/0082914 A1  3/2018   Hanawa et al.
  2018/0305241 A1  10/2018  Sawamura et al.
  2022/0134713 A1  5/2022   Ogawa et al.
  2023/0357091 A1  11/2023  Hanawa et al.

FOREIGN PATENT DOCUMENTS

| CN | 107001115 A | 8/2017 |
|---|---|---|
| CN | 107270755 A | 10/2017 |
| JP | 8-083835 | 3/1996 |
| JP | 11-100229 A | 4/1999 |
| JP | 2005-86711 A | 3/2005 |
| JP | 2005-511472 | 4/2005 |
| JP | 2008-199006 A | 8/2008 |
| JP | 2012-020894 | 2/2012 |
| JP | 2012-148958 A | 8/2012 |
| JP | 2013-197425 A | 9/2013 |
| JP | 2014-165459 A | 9/2014 |
| JP | 2018203571 A | * 12/2018 |
| WO | WO A1 2015/087812 | 6/2015 |
| WO | WO 2021/015059 A1 | 1/2021 |

OTHER PUBLICATIONS

International Search Report issued Jul. 6, 2021 in PCT/JP2021/
021105 filed Jun. 2, 2021, 2 pages.
International Search Report issued Aug. 17, 2021 in PCT/JP2021/
021106 filed Jun. 2, 2021, 3 pages.

* cited by examiner

*Primary Examiner* — Alicia J Weydemeyer

(74) *Attorney, Agent, or Firm* — Oblon, McClelland,
Maier & Neustadt, L.L.P.

(57)                    ABSTRACT

The present invention relates to a glass including, repre-
sented by mole percent based on oxides: from 52% to 80%
of $SiO_2$; from 5% to 30% of $B_2O_3$; from 2% to 30% of
$Al_2O_3$; from 0.1% to 11% of $P_2O_5$; and from 0.0001% to 5%
of $Na_2O$, in which the glass has an average thermal expan-
sion coefficient $\alpha$ at from 50° C. to 350° C. of from $5\times10^{-7}$/°
C. or more and less than $33\times10^{-7}$/° C.

19 Claims, No Drawings

GLASS

CROSS-REFERENCE TO RELATED APPLICATIONS

This is a continuation of International Application No. PCT/JP2021/021105 filed on Jun. 2, 2021, and claims priority from Japanese Patent Applications No. 2020-101051 filed on Jun. 10, 2020, Japanese Patent Applications No. 2020-161312 filed on Sep. 25, 2020, the entire contents of which are incorporated herein by reference.

TECHNICAL FIELD

The present invention relates to a glass suitable for a top plate of a heater.

BACKGROUND ART

In a heater such as a heating cooker, a top plate on which an object to be heated such as a pot is placed is required to have heat resistance. Therefore, a crystallized glass sheet having an extremely small thermal expansion coefficient is used.

For example, Patent Literature 1 discloses a glass composition having an average thermal expansion coefficient of from $-5 \times 10^{-7}$ to $30 \times 10^{-7}/°$ C. in a range of from $30°$ C. to $750°$ C.

Patent Literature 2 discloses a glass composition having an average thermal expansion coefficient of from $15 \times 10^{-7}$ to $30 \times 10^{-7}/°$ C. in a range of from $50°$ C. to $350°$ C.

CITATION LIST

Patent Literature

Patent Literature 1: JPH11-100229A
Patent Literature 2: JP2018-203571A

SUMMARY OF INVENTION

Technical Problem

However, the crystallized glass sheet generally includes two phases, a crystal phase and a glass phase. For this reason, although heat resistance is provided, there is a difficulty in production that requires uniform heat treatment, and there is a problem that a sheet thickness cannot be increased.

Examples of a general glass sheet include TEMPAX (registered trademark of SCHOTT) including $B_2O_3$ in order to impart heat resistance. However, the average thermal expansion coefficient is about $33 \times 10^{-7}/°$ C., which is an upper limit of the average thermal expansion coefficient of a glass that can be produced in a normal melting furnace.

Therefore, in order to decrease the average thermal expansion coefficient, it is conceivable to further increase the content of $B_2O_3$ or add $Al_2O_3$. However, in the case where the content of $B_2O_3$ is increased, a viscosity of the molten glass is increased, and the glass cannot be produced in a normal melting furnace. In addition, in the case where $Al_2O_3$ is added, devitrification or phase separation is likely to occur during production depending on an addition amount thereof.

In order to solve these problems, it is effective to add $Na_2O$ to a glass component, but in the case where $Na_2O$ is included, there was a problem that the average thermal expansion coefficient becomes high, that is, the expansion becomes high. Although a heat-resistant member having a large sheet thickness has been demanded, a glass sheet that achieves low expansion, devitrification prevention, and phase separation prevention in a balanced manner has not been found so far.

Further, in the case where the heat-resistant member is used as a top plate on which an object to be heated such as a pot is placed, there was a problem that the heat-resistant member is damaged during heating due to a scratch caused by contact with the pot.

An object of the present invention is to provide a low expansion glass that has low expansion and excellent heat resistance and is excellent in devitrification prevention and phase separation prevention, and a heat-resistant member using the glass.

Solution to Problem

<1>

A glass including, represented by mole percent based on oxides:
  from 52% to 80% of $SiO_2$;
  from 5% to 30% of $B_2O_3$;
  from 2% to 30% of $Al_2O_3$;
  from 0.1% to 11% of $P_2O_5$; and
  from 0.0001% to 5% of $Na_2O$,
  in which the glass has an average thermal expansion coefficient $\alpha$ at from $50°$ C. to $350°$ C. of from $5 \times 10^{-7}/°$ C. or more and less than $33 \times 10^{-7}/°$ C.

<2>

The glass according to <1>,
  in which the glass has a linear transmittance $T_{850}$ at a wavelength of 850 nm of 87.5% or more when the glass has a glass sheet thickness of 15 mm.

<3>

The glass according to <1> or <2>, further including, represented by mole percent based on oxides:
  from 0.00001% to 0.03% of $Fe_2O_3$.

<4>

The glass according to any one of <1> to <3>, including, represented by mole percent based on oxides:
  from 76.5% to 85% of $SiO_2 + Al_2O_3$; and
  from 0.01% to 5% of $R_2O$ provided that $R_2O$ is at least one of $Li_2O$ and $K_2O$.

<5>

The glass according to any one of <1> to <4>, further including, represented by mole percent based on oxides:
  from 0.1% to 10% of MgO.

<6>

The glass according to any one of <1> to <5>, further including, represented by mole percent based on oxides:
  from 0.1% to 3% of CaO.

<7>

The glass according to any one of <1> to <6>, including, represented by mole percent based on oxides:
  from 55% to 68% of $SiO_2$; and
  from 8.5% to 30% of $Al_2O_3$,
  in which a ratio of the content of $P_2O_5$ to the content of $Al_2O_3$, $P_2O_5/Al_2O_3$, represented by mole percent based on oxides, is from 0.1 to 1.0.

<8>

The glass according to any one of <1> to <7>, including, represented by mole percent based on oxides, from 89% to 99% of $SiO_2 + Al_2O_3 + B_2O_3 + P_2O_5$, and satisfying $(Al_2O_3+B_2O_3)/(SiO_2+P_2O_5)\geq0.3$, which is a ratio of a sum of the contents of $Al_2O_3$ and $B_2O_3$ to $SiO_2+P_2O_5$, represented by mole percent based on oxides.

<9>

The glass according to any one of <6> to <8>, satisfying, represented by mole percent based on oxides,
$(CaO+Na_2O+P_2O_5)/Al_2O_3\geq0.35$.

<10>

A glass sheet including the glass according to any one of <1> to <9>.

<11>

The glass sheet according to <10>,
in which the glass sheet has a sheet thickness of from 4 mm to 150 mm.

<12>

A heat-resistant member including:
the glass sheet according to <10> or <11>; and
a ceramic having a thermal conductivity of 25 Wm/K or more and being bonded to the glass sheet.

<13>

A heat-resistant member including:
the glass sheet according to <10> or <11>; and
a ceramic having a thermal conductivity of 25 Wm/K or more and a difference in expansion coefficient in a region of from 50° C. to 200° C. of within a range of $\pm6.0\times10^{-7}/°$ C., and being bonded to the glass sheet.

<14>

The heat-resistant member according to <12> or <13>, in which the ceramic is bonded by fluororesin bonding.

Advantageous Effects of Invention

According to one embodiment of the present invention, it is possible to provide a low expansion glass that has low expansion and excellent heat resistance and is excellent in devitrification prevention and phase separation prevention, and a heat-resistant member using the glass.

DESCRIPTION OF EMBODIMENTS

Hereinafter, the glass according to one embodiment of the present invention will be described in detail.

However, the present invention is not limited to the following embodiments, and can be freely modified and implemented without departing from the gist of the present invention.

[Description of Terms]

In the present specification, the description of terms is as follows.

The expression "to" means a range of the lower limit value or more and the upper limit value or less.

The composition of the glass is represented by mole percent based on oxides, and the content of a component whose valence is likely to vary in the glass is represented by typical oxides.

Unless otherwise specified, the expression "%" means the mole percent based on oxides.

The term "not substantially contained in the glass composition" means that the component is not contained except for inevitable impurities.

The glass according to one embodiment of the present invention refers to an amorphous glass in which a diffraction peak showing crystals is not observed by an X-ray diffraction method, and does not include the crystallized glass.

[Glass]

The glass according to one embodiment of the present invention includes, represented by mole percent based on oxides, from 52% to 80% of $SiO_2$, from 5% to 30% of $B_2O_3$, from 2% to 30% of $Al_2O_3$, from 0.1% to 11% of $P_2O_5$, and from 0.0001% to 5% of $Na_2O$, and the glass has an average thermal expansion coefficient $\alpha$ at from 50° C. to 350° C. of $5\times10^{-7}/°$ C. or more and less than $33\times10^{-7}/°$ C.

$SiO_2$ is an essential component for forming glass network, and is a main component. $SiO_2$ is included in an amount of 52% or more in order to increase the heat resistance of the glass and to make the glass less likely to be damaged by mechanical impact. The content of $SiO_2$ is preferably 55% or more, more preferably 60% or more, and further preferably 65% or more.

$SiO_2$ is included in an amount of 80% or less in order to reduce the viscosity during glass production. The content of $SiO_2$ is preferably 78% or less, more preferably 75% or less, further preferably 70% or less, and particularly preferably 68% or less.

A range of the content of $SiO_2$ can be specified by any combination of the upper limit and the lower limit.

$B_2O_3$ is an essential component for promoting melting of glass raw materials while maintaining low expansion. $B_2O_3$ is included in an amount of 5% or more in order to improve mechanical properties and weather resistance and to achieve low expansion. The content of $B_2O_3$ is preferably 8% or more, more preferably 10% or more, further preferably 12% or more, and particularly preferably 13% or more.

$B_2O_3$ is included in an amount of 30% or less so as not to cause inconveniences such as generation of ream due to volatilization, erosion of a furnace wall, and reduction in water resistance. The content of $B_2O_3$ is preferably 25% or less, more preferably 20% or less, and further preferably 15% or less.

A range of the content of $B_2O_3$ can be specified by any combination of the upper limit and the lower limit.

$Al_2O_3$ is an essential component for forming a glass network and modifying the glass network. $Al_2O_3$ is included in an amount of 2% or more in order to increase heat resistance of the glass and to prevent weather resistance and phase separation. The content of $Al_2O_3$ is preferably 5% or more, more preferably 8.5% or more, further preferably 10% or more, and still further preferably 13% or more.

$Al_2O_3$ is included in an amount of 30% or less in order to reduce viscosity during glass production and prevent devitrification. The content of $Al_2O_3$ is preferably 25% or less, more preferably 20% or less, and further preferably 15% or less. A range of the content of $Al_2O_3$ can be specified by any combination of the upper limit and the lower limit.

$P_2O_5$ is an essential component for preventing crystallization and devitrification of a glass. $P_2O_5$ is included in an amount of 0.1% or more in order to stabilize the glass. The content of $P_2O_5$ is more preferably 2% or more, further preferably 3% or more, and particularly preferably 3.5% or more.

$P_2O_5$ is included in an amount of 11% or less since $P_2O_5$ can stabilize the glass without making the high-temperature viscosity of the glass too high. The content of $P_2O_5$ is preferably 9.5% or less, more preferably 9% or less, further preferably 8% or less, and particularly preferably 5% or less.

A range of the content of $P_2O_5$ can be specified by any combination of the upper limit and the lower limit.

$Na_2O$ is an essential component for improving an electrical conductivity of the glass at a high temperature, promoting the melting of glass raw materials, and adjusting a thermal expansion coefficient, viscosity, and the like of the glass. $Na_2O$ is included in an amount of 0.0001% or more in order to improve the solubility, refining property, and formability of the glass at a high temperature. The content of $Na_2O$ is preferably 0.0005% or more, more preferably 0.01% or more, and further preferably 0.5% or more.

$Na_2O$ is included in an amount of 5% or less in order to reduce a thermal expansion coefficient of the glass, reduce a stress generated during temperature change, and prevent cracking due to thermal shock. The content of $Na_2O$ is preferably 3% or less, more preferably 2.5% or less, and further preferably 1% or less, from the viewpoint of setting the average thermal expansion coefficient to a desired value.

A range of the content of $Na_2O$ can be specified by any combination of the upper limit and the lower limit.

The average thermal expansion coefficient $\alpha$ of the glass according to one embodiment of the present invention is $5\times10^{-7}/°$ C. or more less than and $33\times10^{-7}/°$ C. in a temperature range of from 50° C. to 350° C. The average thermal expansion coefficient $\alpha$ is preferably $7\times10^{-7}/°$ C. or more, more preferably $10\times10^{-7}/°$ C. or more, further preferably $15\times10^{-7}/°$ C. or more, and particularly preferably $20\times10^{-7}1°$ C. or more, from the viewpoint of bonding with the ceramic.

The average thermal expansion coefficient $\alpha$ is preferably $30\times10^{-7}/°$ C. or less, more preferably $28\times10^{-7}/°$ C. or less, and further preferably $27\times10^{-7}/°$ C. or less, in order to reduce a thermal stress generated during temperature change and prevent cracking due to thermal shock.

The glass according to one embodiment of the present invention can efficiently transmit infrared rays by setting the linear transmittance $T_{850}$ at a wavelength of 850 nm to 87.5% or more when the glass has a glass sheet thickness of 15 mm. Therefore, in the case of a laminate in which SiC is laminated on the glass according to one embodiment of the present invention, SiC can be efficiently heated by infrared rays from a heater irradiated to the glass side. From the viewpoint of efficiency during heating of the heater, the linear transmittance $T_{850}$ is more preferably 88% or more, further preferably 89% or more, and still further preferably 90% or more.

The linear transmittance $T_{850}$ can be measured by, for example, a double beam spectrophotometer (V-650 type, manufactured by JASCO Corporation), and is measured in a measurement wavelength region of from 400 nm to 1200 nm, and the transmittance at a measurement wavelength of 850 nm is defined as the linear transmittance.

The glass according to one embodiment of the present invention preferably further includes from 0.00001% to 0.03% of $Fe_2O_3$ represented by mole percent based on oxides. The content of $Fe_2O_3$ is more preferably 0.0001% or more, and further preferably 0.0005% or more in order to improve the refining property of the glass while maintaining the linear transmittance at a wavelength of 850 nm without impairing the hue of the glass and to control a temperature of a bottom base material of a melting furnace.

In order to maintain the hue of the glass, the content of $Fe_2O_3$ is more preferably 0.02% or less, and further preferably 0.01% or less. A range of the content of $Fe_2O_3$ can be specified by any combination of the upper limit and the lower limit.

The glass according to one embodiment of the present invention preferably includes from 76.5% to 85% of $SiO_2$+$Al_2O_3$ and from 0.01% to 5% of $R_2O$ in which $R_2O$ is at least one of $Li_2O$ and $K_2O$.

By setting $SiO_2$+$Al_2O_3$ in an amount of 76.5% to 85%, it is possible to make the glass low expansion. The total content of $SiO_2$ and $Al_2O_3$ is more preferably 77% or more, and further preferably 78% or more.

In order to reduce the devitrification temperature and enable the production, the total content of $SiO_2$ and $Al_2O_3$ is more preferably 83% or less, further preferably 82% or less, and still further preferably 80% or less.

$R_2O$ is a component useful for improving the electrical conductivity of the glass at a high temperature. In addition, $R_2O$ is a useful component for promoting the melting of the glass raw materials and adjusting the thermal expansion coefficient, viscosity, and the like of the glass. Here, $R_2O$ represents at least one of $Li_2O$ and $K_2O$.

The content of $R_2O$ is preferably 0.01% or more, more preferably 0.1% or more, and further preferably 0.5% or more. By reducing the thermal expansion coefficient of the glass, it is possible to reduce the stress generated during temperature change.

The content of $R_2O$ is preferably 5.0% or less, more preferably 4.0% or less, further preferably 3.0% or less, and still further preferably 1% or less.

A range of the content of $R_2O$ can be specified by any combination of the upper limit and the lower limit.

The glass according to one embodiment of the present invention preferably further includes from 0.1% to 10% of MgO represented by mole percent based on oxides. The content of MgO is preferably 0.1% or more, more preferably 0.5% or more, further preferably 1% or more, and still further preferably 2% or more in order to reduce the viscosity of the glass to enhance the manufacturability while exhibiting low expansion.

The content of MgO is preferably 10% or less, more preferably 8% or less, and further preferably 6% or less in order to lower the devitrification temperature of the glass to increase the productivity while exhibiting low expansion.

A range of the content of MgO can be specified by any combination of the upper limit and the lower limit.

The glass according to one embodiment of the present invention preferably further includes from 0.1% to 3% of CaO represented by mole percent based on oxides. The content of CaO is preferably 0.1% or more, more preferably 0.3% or more, and further preferably 0.5% or more in order to reduce the viscosity of the glass to enhance the manufacturability while exhibiting low expansion.

In addition, the content of CaO is preferably 3% or less, more preferably 2% or less, and further preferably 1% or less in order to lower the devitrification temperature of the glass to increase the productivity while exhibiting low expansion.

A range of the content of CaO can be specified by any combination of the upper limit and the lower limit.

The glass according to one embodiment of the present invention preferably further includes, represented by mole percent based on oxides, from 55% to 68% of $SiO_2$ and from 8.5% to 30% of $Al_2O_3$, in which a ratio of the content of $P_2O_5$ to the content of $Al_2O_3$, $P_2O_5/Al_2O_3$, represented by mole percent based on oxides, is from 0.1 to 1.0.

In the case where $P_2O_5/Al_2O_3$ is less than 0.1, the glass is unstable and vitrification becomes difficult, or a crystallization temperature becomes low. In the case where $P_2O_5/Al_2O_3$ is more than 1.0, the chemical resistance may be lowered, or the viscosity of the glass becomes too high. $P_2O_5/Al_2O_3$ is more preferably from 0.3 to 0.8, further preferably from 0.35 to 0.7, and most preferably from 0.40 to 0.65.

In the glass according to one embodiment of the present invention, represented by mole percent based on oxides, $SiO_2$+$Al_2O_3$+$B_2O_3$+$P_2O_5$ is preferably from 89% to 99%, and $(Al_2O_3$+$B_2O_3)/(SiO_2$+$P_2O_5)$, which is a ratio of a sum of the contents of $Al_2O_3$ and $B_2O_3$ to $SiO_2$+$P_2O_5$, is preferably 0.3 or more. That is, it is preferable that $(Al_2O_3+B_2O_3)/(SiO_2+P_2O_5) \geq 0.3$. In the case where $(Al_2O_3+B_2O_3)/(SiO_2+P_2O_5)$ is less than 0.3, the glass is unstable and is likely to undergo phase separation, or the devitrification temperature is low, and furthermore, the viscosity of the glass is too high.

$(Al_2O_3+B_2O_3)/(SiO_2+P_2O_5)$ is preferably 0.33 or more, and more preferably 0.35 or more.

In the glass according to one embodiment of the present invention, it is preferable that $(CaO+Na_2O+P_2O_5)/Al_2O_3 \geq 0.35$, represented by mole percent based on oxides, be satisfied. In the case where $(CaO+Na_2O+P_2O_5)/Al_2O_3$ is less than 0.35, the devitrification temperature of the glass increases, and the manufacturing properties may deteriorate.

$(CaO+Na_2O+P_2O_5)/Al_2O_3$ is preferably 0.4 or more, and more preferably 0.45 or more.

If necessary, the glass according to one embodiment of the present invention may include RO (in which RO is at least one of SrO, BaO, and ZnO) in order to reduce the viscosity of the glass, increase the solubility, and control the expansion coefficient. The content of RO is preferably 0.1% or more, more preferably 1.5% or more, and further preferably 3.0% or more.

In order to lower the devitrification temperature of the glass, increase the solubility, and control the expansion coefficient, RO is preferably 12% or less, more preferably 10% or less, further preferably 7.5% or less, and still further preferably 5% or less.

In order to achieve the purpose, the composition of the glass according to one embodiment of the present invention is not limited thereto, and for example, $TiO_2$, $ZrO_2$, and $Y_2O_3$ may be appropriately added within a range of from 0% to 5%.

The method for producing the glass according to one embodiment of the present invention is not particularly limited, and the method for forming the molten glass is not particularly limited, but the glass can be produced, for example, as follows.

First, glass raw materials are appropriately prepared, melted by heating to about 1600° C. to 1700° C., homogenized by defoaming, stirring, or the like, formed into a sheet shape by a known float method, a down-draw method (fusion method or the like), a press method, a roll-out method, a slip casting method, or the like, or formed into a block shape by casting, annealed, and then cut into a desired size to produce a glass (glass sheet).

Although polishing is performed as necessary, a surface of the glass sheet may be treated with a fluorine agent in addition to the polishing or instead of the polishing. In view of stable production of a glass sheet, a float method or a down-draw method is preferable, and in particular, in view of production of a large-sized glass sheet, a float method is preferable.

In addition, when the present glass is used, the present glass may be subjected to physical strengthening to improve scratch resistance and heat resistance.

[Glass Sheet]

A glass sheet according to one embodiment of the present invention includes the glass. That is, the glass sheet is obtained by shaping the glass by a desired production method.

A sheet thickness of the glass sheet is not particularly limited, but is preferably from 4 mm to 150 mm, more preferably from 5 mm to 120 mm, further preferably from 7 mm to 100 mm, and still further preferably from 10 mm to 30 mm, from the viewpoint of supporting a heavy object as a top plate on which a heating cooker is placed and from the viewpoint of infrared transmittance as a heat-resistant member to be described later.

A shape of the glass sheet can be appropriately set to a desired shape, and may be, for example, a rectangular shape or a substantially circular shape.

[Heat-Resistant Member]

The applications of the glass and the glass sheet according to one embodiment of the present invention are not particularly limited, but the glass is a low expansion glass that is excellent in heat resistance and is also excellent in devitrification prevention and phase separation prevention, and thus, the glass and the glass sheet can be suitably used in various applications such as a top plate of a heater such as a heating cooker, a window material of a high-temperature furnace, and a building material requiring fire resistance.

Among these, the glass and the glass sheet can be used particularly preferably for a top plate of a heater such as a heating cooker. The heating cooker may be an induction heating type heating cooker (induction heating cooker), a gas combustion type heating cooker (gas heating cooker), or a kitchen glass counter including the heating cooker.

Since the glass according to one embodiment of the present invention is not crystallized glass but a transparent glass, a coloring component may be appropriately added depending on the color tone and design of the surroundings.

For example, in the case where the glass is assumed to be applied to a top plate of a heating cooker, an organic printed layer including ink containing an inorganic filler or the like may be further included on a main surface of the glass in order to conceal the inside of the heating cooker. The organic printed layer containing such an inorganic filler is typically provided on a main surface (back surface) of glass that is opposite to a main surface with which an object to be heated comes into contact on the top plate of the heating cooker. A color tone of the organic printed layer containing an inorganic filler is not particularly limited, but is preferably matched with a color tone of a kitchen counter arranged around the heating cooker, and thus the uniformity of the color tone can be provided.

The thermal conductivity of a ceramic bonded to an upper surface of the glass sheet according to one embodiment of the present invention is preferably 25 Wm/K or more. In the case where the thermal conductivity is less than 25 Wm/K, it is difficult to raise a temperature at high speed. The thermal conductivity is preferably 35 Wm/K or more, more preferably 50 Wm/K or more, further preferably 100 Wm/K or more, and still further preferably 150 Wm/K or more.

A difference in expansion coefficient between a ceramic material and the glass in a region of from 50° C. to 200° C. is preferably within a range of $\pm 6.0 \times 10^{-7}/°$ C. ($-6.0 \times 10^{-7}/°$ C. or more and $6.0 \times 10^{-7}/°$ C. or less). In the case where the difference in expansion coefficient is out of the range off $6.0 \times 10^{-7}/°$ C., a stress is generated due to the difference in expansion coefficient between the ceramic and the glass, and the ceramic may be warped or damaged during rapid heating and cooling.

The difference in expansion coefficient is preferably within a range of $\pm 5 \times 10^{-7}/°$ C. ($-5 \times 10^{-7}/°$ C. or more and $5 \times 10^{-7}/°$ C. or less), more preferably within a range off $3 \times 10^{-7}/°$ C. ($-3 \times 10^{-7}/°$ C. or more and $3 \times 10^{-7}/°$ C. or less), further preferably within a range of $\pm 1.5 \times 10^{-7}/°$ C. ($-1.5 \times 10^{-7}/°$ C. or more and $1.5 \times 10^{-7}/°$ C. or less), and particularly preferably within a range of $\pm 1 \times 10^{-7} 1°$ C. ($-1 \times 10^{-7} 1°$ C. or more and $1 \times 10^{-7} 1°$ C. or less).

Considering that the average thermal expansion coefficient $\alpha$ of the glass at from 50° C. to 350° C. is $5 \times 10^{-7}/°$ C.

or more and less than $33 \times 10^{-7}/°$ C., the ceramic material is preferably at least one of SiC, Si—SiC, and $Si_3N_4$.

In Si—SiC, the content of Si is preferably from 5 wt % to 55 wt %. In the case where the content of Si is less than 5 wt %, the expansion is high, and it is difficult to obtain sufficient thermal shock properties. On the other hand, in the case where the content of Si is more than 55 wt %, the Young's modulus decreases and the bending strength decreases. The content of Si is preferably from 14 wt % to 40 wt %, more preferably from 17 wt % to 35 wt %, and particularly preferably from 20 wt % to 30 wt %.

In addition, in order to bond the ceramic material and the glass to each other, it is preferable to use fluororesin from the viewpoint of heat resistance and acid resistance. Examples of the fluororesin include PTFE (polytetrafluoroethylene) and PFA (tetrafluoroethylene-perfluoroalkyl vinyl ether copolymer)

A ceramic having the thermal conductivity of 25 Wm/K or more is preferably bonded to the glass sheet according to one embodiment of the present invention by fluororesin bonding.

The adhesive strength is preferably 25 MPa or more in terms of tensile strength.

In order to ensure heat resistance, a glass transition point is preferably 150° C. or higher, more preferably 200° C. or higher, and further preferably 250° C. or higher.

The Young's modulus is preferably 2.5 GPa or less.

As described above, damage due to scratches on the top plate can be prevented by bonding the glass sheet and the ceramic using the fluororesin, which is suitable.

EXAMPLES

Hereinafter, the present invention will be described in detail with reference to Examples and Comparative Examples, but the present invention is not limited thereto.

Examples 1 to 27 are Examples, and Examples 28 to 30 are Comparative Examples.

[Preparation]

Raw materials were prepared in a manner of having compositions shown in Tables 1 and 2 represented by mole percent based on oxides, put into a platinum crucible, put into an electric resistance furnace at 1650° C., melted for 3 hours, defoamed, and homogenized. Blanks in Tables 1 and 2 mean that components are not included.

The obtained molten glass was poured into a mold, held at a temperature higher than a glass transition point temperature Tg by 50° C. for 3 hours, and then cooled to room temperature at a rate of 1° C./min to obtain glass blocks of Examples 1 to 30. Further, a glass sheet was obtained by cutting the obtained glass block into a sheet-shaped glass.

[Average Thermal Expansion Coefficient α]

A round bar having a diameter of 4.0 mm and a length of 20 mm was cut out from the obtained glass sheet, and an average thermal expansion coefficient α (unit: $°$ C.$^{-1}$) at from 50° C. to 350° C. was measured by a thermomechanical analyzer (TDS5000SA, manufactured by BRUKER Corporation) in accordance with JIS R3102. The results are shown in Tables 3 and 4.

[Evaluation of Devitrification]

Regarding the obtained glass block, a temperature serving as a reference for devitrification of the glass, that is, a temperature T3 at which the viscosity of the glass becomes $10^3$ dPa·s was measured using a rotary viscometer. The glass block was held at T3 temperature for 15 hours, and was visually observed for presence of devitrification. A glass block having crystals was evaluated as B, and a glass block having no crystals was evaluated as A. The results are shown in Tables 3 and 4.

[Evaluation of Phase Separation]

A round bar having a diameter of 4.0 mm and a length of 20 mm was cut out from the obtained glass block and measured by a thermomechanical analyzer (TDS5000SA, manufactured by BRUKER Corporation). A sample that was unmeasurable due to bending near Tg and that was visually cloudy was evaluated as B for phase separation, and other samples were evaluated as A. The results are shown in Tables 3 and 4. In the case of phase separation, an accurate thermal expansion coefficient curve cannot be obtained.

[Linear Transmittance]

The obtained glass block was cut, polished, and processed to have a mirror surface on both sides with a thickness of 15 mm to obtain a glass sheet. The linear transmittance was measured by a double beam spectrophotometer (V-650 type, manufactured by JASCO Corporation). The linear transmittance was measured in a measurement wavelength region of from 400 nm to 1200 nm, and the transmittance at a measurement wavelength of 850 nm was defined as the linear transmittance. The results are shown in Tables 3 and 4.

[Thermal Shock Test]

The obtained glass sheets (Examples 1 to 30) were polished so that both surfaces thereof were mirror surfaces, were followed by being processed to have the size of the glass sheets of 100 mm×100 mm×4 mm, or being processed into composite members (Examples 1 and 10, and TEMPAX) produced below having the size of 100 mm×100 mm×22 mm, and then the glass sheets and the composite members were heated at 250° C. for 10 minutes and dropped into water three times. The case where all the glass sheets and composite members were broken was evaluated as B, and the case where all the glass sheets and composite members were not broken was evaluated as A. The evaluation results of the glass sheet are shown in Tables 3 and 4, and the evaluation results of the composite member are shown in Table 5. As the evaluation results in Tables 3 and 4, the glass sheet having a size of 100 mm×100 mm×4 mm was used, and as the evaluation results in Table 5, the glass sheet having a size of 100 mm×100 mm×22 mm was used.

The composite member was produced as follows.

First, the obtained glass block (Examples 1 and 10) and TEMPAX (registered trademark of Corning Incorporated) were cut, polished, and processed to have a mirror surface on both sides with a thickness of 15 mm to obtain a glass sheet.

Next, a Si—SiC member and a SiC member obtained as described below were processed to have a mirror surface on both sides with a thickness of 7 mm to obtain a ceramic sheet.

<Si-SiC Member>

To a kneader (manufactured by Miyazaki Iron Works Co., Ltd., model number: MP100), 71.0 wt % of SiC powder (made by Pacific Rundum Co., Ltd., model number: GMF-12S (average grain diameter: 0.7 μm)), 2.0 wt % of carbon black (average grain diameter: 0.03 μm), 5.5 wt % of Metolose (made by Shin-Etsu Chemical Co., Ltd., model number: SM8000) as a binder, and 21.5 wt % of pure water were added, and kneaded for 6 hours to obtain kneaded clay. The obtained kneaded clay was put into an extruder (manufactured by Miyazaki Iron Works Co., Ltd., model number: FM100), and was extruded under conditions of a head pressure of 1.0 MPa and a discharge rate of 1200 g/min to obtain a molded body. The obtained molded body was dried at 50° C. for 4 days, and then heated in an air atmosphere at 450° C. for 3 hours for degreasing to obtain a degreased body. The obtained degreased body was fired in a carbon firing furnace under a condition of a vacuum atmosphere of $10^{-3}$ Pa at 1700° C. for 2 hours to obtain a sintered body. After firing, Si was impregnated at 1670° C. in an argon atmosphere to obtain a Si—SiC member.

<SiC Member>

To a ball mill pot made of nylon, 93.6 wt % of SiC powder (made by Pacific Rundum Co., Ltd., model number: GMF-12S (average grain diameter: 0.7 μm)), 1.9 wt % of $B_4C$ powder (made by Kojundo Chemical Lab. Co., Ltd., model number: BBI10PB (average grain diameter: 0.5 μm)) as a sintering aid, 1.5 wt % of carbon powder (made by Showa Denko K.K., model number: UF-G5 (average grain diameter: 3 μm)), 3.0 wt % of polyoxyethylene lauryl ether as a dispersant, anhydrous ethanol as a medium, and high-purity silicon carbide balls having a diameter of 5 mm as a grinding medium were added, and mixed and ground by a rotary ball mill for 96 hours. The obtained slurry was dried under reduced pressure to obtain a raw material powder. The obtained raw material powder was weighed out so as to obtain a sintered body having a desired thickness, and pressed at a pressure of 2000 kg/cm² using a cold isostatic pressing machine to obtain a molded body. The obtained molded body was placed in a carbon container, and sintered in a carbon firing furnace under a condition of a vacuum atmosphere of $10^{-3}$ Pa at 2150° C. for 1 hour to obtain a SiC sintered body.

Subsequently, a PFA film having a thickness of 50 μm was placed on the ceramic member (Si—SiC member or SiC member) having a thickness of 7 mm obtained above, and the glass sheet having a thickness of 15 mm obtained above was further stacked on the film together with a bonding resin described in Table 5, was heated and crimped at 1 MPa for 30 minutes at 300° C. of not less than Tg of the film, and cooled to room temperature while being pressurized, and thus a composite member of a ceramic and a glass sheet was obtained (Examples 1 and 10, and TEMPAX).

TABLE 1

| mol % | Example 1 | Example 2 | Example 3 | Example 4 | Example 5 | Example 6 | Example 7 | Example 8 |
|---|---|---|---|---|---|---|---|---|
| $SiO_2$ | 65.1 | 65.6 | 65.6 | 65.6 | 65.6 | 65.6 | 63.6 | 63.6 |
| $Al_2O_3$ | 13.7 | 12.0 | 15.0 | 15.0 | 15.0 | 12.0 | 17.0 | 14.0 |
| $B_2O_3$ | 13.1 | 14.4 | 11.4 | 14.4 | 9.4 | 12.4 | 9.4 | 12.4 |
| MgO | 2.0 | 1.0 | 1.0 | 1.0 | 1.0 | 1.0 | 1.0 | 1.0 |
| CaO | 0.5 | | | | | | | |
| $Li_2O$ | 0.4 | 0.4 | 0.4 | 0.4 | 0.4 | 0.4 | 0.4 | 0.4 |
| $Na_2O$ | 1.2 | 0.6 | 0.6 | 0.6 | 0.6 | 0.6 | 0.6 | 0.6 |
| $ZrO_2$ | | | | | | | | |
| $P_2O_5$ | 3.9 | 5.9 | 5.9 | 2.9 | 7.9 | 7.9 | 7.9 | 7.9 |
| $Fe_2O_3$ | 0.0013 | 0.0013 | 0.0013 | 0.0013 | 0.0013 | 0.0013 | 0.0013 | 0.0013 |
| $SnO_2$ | 0.12 | 0.12 | 0.12 | 0.12 | 0.12 | 0.12 | 0.12 | 0.12 |
| total | 100.0 | 100.0 | 100.0 | 100.0 | 100.0 | 100.0 | 100.0 | 100.0 |
| $SiO_2 + Al_2O_3$ | 78.8 | 77.6 | 80.6 | 80.6 | 80.6 | 77.6 | 80.6 | 77.6 |
| $P_2O_5/Al_2O_3$ | 0.28 | 0.49 | 0.39 | 0.19 | 0.53 | 0.66 | 0.46 | 0.56 |
| $SiO_2 + Al_2O_3 + B_2O_3 + P_2O_5$ | 95.80 | 97.90 | 97.90 | 97.90 | 97.90 | 97.90 | 97.90 | 97.90 |
| $(CaO + Na_2O + P_2O_5)/Al_2O_3$ | 0.41 | 0.54 | 0.43 | 0.23 | 0.57 | 0.71 | 0.50 | 0.61 |
| $(B_2O_3 + Al_2O_3)/(SiO_2 + P_2O_5)$ | 0.39 | 0.37 | 0.37 | 0.43 | 0.33 | 0.33 | 0.37 | 0.37 |

| mol % | Example 9 | Example 10 | Example 11 | Example 12 | Example 13 |
|---|---|---|---|---|---|
| $SiO_2$ | 63.6 | 61.5 | 64.6 | 64.1 | 64.6 |
| $Al_2O_3$ | 17.0 | 15.5 | 13.7 | 13.7 | 13.7 |
| $B_2O_3$ | 9.4 | 14.0 | 13.6 | 14.1 | 13.1 |
| MgO | 0.5 | | 2.0 | 2.0 | 2.0 |
| CaO | 0.5 | | 0.5 | 0.5 | 0.5 |
| $Li_2O$ | 0.4 | | 0.4 | 0.4 | 0.9 |
| $Na_2O$ | 0.6 | 1.5 | 1.2 | 1.2 | 1.2 |
| $ZrO_2$ | | | | | |
| $P_2O_5$ | 7.9 | 7.5 | 3.9 | 3.9 | 3.9 |
| $Fe_2O_3$ | 0.0013 | 0 | 0.0013 | 0.0013 | 0.0013 |
| $SnO_2$ | 0.12 | 0 | 0.12 | 0.12 | 0.12 |
| total | 100.0 | 100.0 | 100.0 | 100.0 | 100.0 |
| $SiO_2 + Al_2O_3$ | 80.6 | 77.0 | 78.3 | 77.8 | 78.3 |
| $P_2O_5/Al_2O_3$ | 0.46 | 0.48 | 0.28 | 0.28 | 0.28 |
| $SiO_2 + Al_2O_3 + B_2O_3 + P_2O_5$ | 97.90 | 98.50 | 95.80 | 95.80 | 95.30 |
| $(CaO + Na_2O + P_2O_5)/Al_2O_3$ | 0.53 | 0.58 | 0.41 | 0.41 | 0.41 |
| $(B_2O_3 + Al_2O_3)/(SiO_2 + P_2O_5)$ | 0.37 | 0.43 | 0.40 | 0.41 | 0.39 |

TABLE 2

| mol % | Example 14 | Example 15 | Example 16 | Example 17 | Example 18 | Example 19 | Example 20 | Example 21 | Example 22 | Example 23 |
|---|---|---|---|---|---|---|---|---|---|---|
| $SiO_2$ | 64.1 | 64.6 | 64.1 | 64.6 | 64.1 | 64.6 | 64.1 | 64.6 | 64.1 | 64.6 |
| $Al_2O_3$ | 13.7 | 13.7 | 13.7 | 13.7 | 13.7 | 13.7 | 13.7 | 14.2 | 14.7 | 13.7 |
| $B_2O_3$ | 13.1 | 13.1 | 13.1 | 13.1 | 13.1 | 13.1 | 13.1 | 13.1 | 13.1 | 13.1 |
| MgO | 2.0 | 2.0 | 2.0 | 2.5 | 3.0 | 2.0 | 2.0 | 2.0 | 2.0 | 2.0 |
| CaO | 0.5 | 0.5 | 0.5 | 0.5 | 0.5 | 1.0 | 1.5 | 0.5 | 0.5 | 0.5 |
| $Li_2O$ | 1.4 | 0.4 | 0.4 | 0.4 | 0.4 | 0.4 | 0.4 | 0.4 | 0.4 | 0.4 |
| $Na_2O$ | 1.2 | 1.7 | 2.2 | 1.2 | 1.2 | 1.2 | 1.2 | 1.2 | 1.2 | 1.2 |
| $ZrO_2$ | | | | | | | | | | |
| $P_2O_5$ | 3.9 | 3.9 | 3.9 | 3.9 | 3.9 | 3.9 | 3.9 | 3.9 | 3.9 | 4.4 |
| $Fe_2O_3$ | 0.0013 | 0.0013 | 0.0013 | 0.0013 | 0.0013 | 0.0013 | 0.0013 | 0.0013 | 0.0013 | 0.0013 |
| $SnO_2$ | 0.12 | 0.12 | 0.12 | 0.12 | 0.12 | 0.12 | 0.12 | 0.12 | 0.12 | 0.12 |
| total | 100.0 | 100.0 | 100.0 | 100.0 | 100.0 | 100.0 | 100.0 | 100.0 | 100.0 | 100.0 |
| $SiO_2 + Al_2O_3$ | 77.8 | 78.3 | 77.8 | 78.3 | 77.8 | 78.3 | 77.8 | 78.8 | 78.8 | 78.3 |
| $P_2O_5/Al_2O_3$ | 0.28 | 0.28 | 0.28 | 0.28 | 0.28 | 0.28 | 0.28 | 0.27 | 0.27 | 0.32 |
| $SiO_2 + Al_2O_3 + B_2O_3 + P_2O_5$ | 94.80 | 95.30 | 94.80 | 95.30 | 94.80 | 95.30 | 94.80 | 95.80 | 95.80 | 95.80 |
| $(CaO + Na_2O + P_2O_5)/Al_2O_3$ | 0.41 | 0.45 | 0.48 | 0.41 | 0.41 | 0.45 | 0.48 | 0.39 | 0.38 | 0.45 |
| $(B_2O_3 + Al_2O_3)/(SiO_2 + P_2O_5$ | 0.39 | 0.39 | 0.39 | 0.39 | 0.39 | 0.39 | 0.39 | 0.40 | 0.41 | 0.39 |

| mol % | Example 24 | Example 25 | Example 26 | Example 27 | Example 28 | Example 29 | Example 30 |
|---|---|---|---|---|---|---|---|
| $SiO_2$ | 64.1 | 65.6 | 63.1 | 63.1 | 64.73 | 65.6 | 81.0 |
| $Al_2O_3$ | 13.7 | 14.0 | 13.7 | 13.7 | 9.38 | 12.0 | 2.0 |
| $B_2O_3$ | 13.1 | 13.4 | 13.1 | 13.1 | 10.32 | 10.4 | 13.0 |
| MgO | 2.0 | 2.0 | 2.0 | 2.0 | 4.69 | 1.0 | |
| CaO | 0.5 | | 0.5 | 0.5 | | | |
| $Li_2O$ | 0.4 | 0.4 | 0.4 | 1.4 | 5.71 | 0.4 | |
| $Na_2O$ | 1.2 | 0.6 | 3.2 | 2.2 | | 0.6 | 4.0 |
| $ZrO_2$ | | | | | 0.94 | | |
| $P_2O_5$ | 4.9 | 3.9 | 3.9 | 3.9 | 3.75 | 9.9 | |
| $Fe_2O_3$ | 0.0013 | 0.0075 | 0.0013 | 0.0013 | | 0.0013 | |
| $SnO_2$ | 0.12 | 0.09 | 0.12 | 0.12 | 0.48 | 0.12 | |
| total | 100.0 | 100.0 | 100.0 | 100.0 | 100.0 | 100.0 | 100.0 |
| $SiO_2 + Al_2O_3$ | 77.8 | 79.6 | 76.8 | 76.8 | 74.1 | 77.6 | 83.0 |
| $P_2O_5/Al_2O_3$ | 0.36 | 0.28 | 0.28 | 0.28 | 0.40 | 0.83 | 0.00 |
| $SiO_2 + Al_2O_3 + B_2O_3 + P_2O_5$ | 95.80 | 96.90 | 93.80 | 93.80 | 88.18 | 97.90 | 96.00 |
| $(CaO + Na_2O + P_2O_5)/Al_2O_3$ | 0.48 | 0.32 | 0.55 | 0.48 | 0.40 | 0 88 | 2.00 |
| $(B_2O_3 + Al_2O_3)/(SiO_2 + P_2O_5$ | 0.39 | 0.39 | 0.40 | 0.40 | 0.29 | 0.30 | 0.19 |

TABLE 3

| mol % | Example 1 | Example 2 | Example 3 | Example 4 | Example 5 | Example 6 | Example 7 | Example 8 |
|---|---|---|---|---|---|---|---|---|
| Average Thermal Expansion Coefficient α ($\times 10^{-7}/°$ C.) (50° C. to 350° C.) | 25.4 | 21.6 | 20.6 | 24.0 | 16.1 | 19.5 | 18.0 | 18.8 |
| Linear Transmittance $T_{850}$ (15 mm t) % | 90.5 | 90.5 | 90.4 | 89.1 | 91.0 | 90.0 | 90.8 | 91.2 |
| Devitrification (T3) | A | A | A | A | A | A | A | A |
| Phase Separation | A | A | A | A | A | A | A | A |
| Thermal Shock | A | A | A | A | A | A | A | A |

TABLE 3-continued

| mol % | | Example 9 | Example 10 | Example 11 | Example 12 | Example 13 |
|---|---|---|---|---|---|---|
| | Average Thermal Expansion Coefficient $\alpha$ ($\times 10^{-7}$/° C.) (50° C. to 350° C.) | 18.4 | 27.5 | 23.8 | 25.0 | 25.2 |
| | Linear Transmittance $T_{850}$ (15 mm t) % | 91.1 | 90 | 90.1 | 90.5 | 90.0 |
| | Devitrification (T3) | A | A | A | A | A |
| | Phase Separation | A | A | A | A | A |
| | Thermal Shock | A | A | A | A | A |

TABLE 4

| mol % | Example 14 | Example 15 | Example 16 | Example 17 | Example 18 | Example 19 | Example 20 | Example 21 | Example 22 | Example 23 |
|---|---|---|---|---|---|---|---|---|---|---|
| Average Thermal Expansion Coefficient $\alpha$ ($\times 10^{-7}$/° C.) (50° C. to 350° C.) | 28.3 | 24.0 | 27.2 | 25.3 | 25.5 | 24.0 | 25.7 | 24.1 | 26.7 | 25.0 |
| Linear Transmittance $T_{850}$ (15 mm t) % | 90.6 | 90.2 | 90.1 | 90.3 | 90.0 | 90.7 | 90.2 | 90.1 | 90.0 | 91.0 |
| Devitrification (T3) | A | A | A | A | A | A | A | A | A | A |
| Phase Separation | A | A | A | A | A | A | A | A | A | A |
| Thermal Shock | A | A | A | A | A | A | A | A | A | A |

| mol % | | Example 24 | Example 25 | Example 26 | Example 27 | Example 28 | Example 29 | Example 30 |
|---|---|---|---|---|---|---|---|---|
| | Average Thermal Expansion Coefficient $\alpha$ ($\times 10^{-7}$/° C.) (50° C. to 350° C.) | 23.5 | 24.3 | 32.6 | 32.5 | 34.8 | Unmeasurable | 33 |
| | Linear Transmittance $T_{850}$ (15 mm t) % | 90.8 | 87.1 | 91.4 | 91.0 | 90 | 86.7 | 91.0 |
| | Devitrification (T3) | A | A | A | A | A | A | A |
| | Phase Separation | A | A | A | A | A | B | A |
| | Thermal Shock | A | A | A | A | B | B | B |

TABLE 5

| Glass | Example 1 | Example 10 | TEMPAX |
|---|---|---|---|
| Average Thermal Expansion Coefficient $\alpha$ ($\times 10^{-7}$/° C.) (50° C. to 350° C.) of Glass | 25.4 | 27.5 | 33 |
| Average Thermal Expansion Coefficient $\alpha$ ($\times 10^{-7}$/° C.) (50° C. to 350° C.) of Glass | 25 | 27 | 34 |

TABLE 5-continued

| Glass | Example 1 | Example 10 | TEMPAX |
|---|---|---|---|
| Ceramic | SiC | Si—SiC | SiC |
| Average Thermal Expansion Coefficient $\alpha$ ($\times 10^{-7}$/° C.) (50° C. to 200° C.) of Ceramic | 26 | 32 | 26 |
| Bonding Resin | PFA | PFA | PFA |
| Thermal Shock | A | A | B |

Examples 1 to 27 were the low expansion glasses that have low expansion and excellent heat resistance, are excellent in devitrification prevention and phase separation prevention, and also have excellent transmittance at 850 nm and thermal shock. In addition, the composite members of Examples (Examples 1 and 10) were excellent in thermal shock properties when bonded to the ceramic, as compared with a case of using TEMPAX of Comparative Examples.

On the other hand, Examples 28 to 30, which are Comparative Examples were the glasses that do not satisfy all of low expansion, heat resistance, devitrification prevention, and phase separation prevention, and have poor thermal shock. In Example 29, since phase separation was performed, an accurate thermal expansion coefficient curve could not be obtained.

Although various embodiments have been described above, it is needless to say that the present invention is not limited to these embodiments. It is apparent to those skilled in the art that various variations and modifications can be conceived within the scope of the claims, and it is also understood that such variations and modifications belong to the technical scope of the present invention. Components in the embodiments described above may be combined freely within a range not departing from the spirit of the invention.

The present application is based on Japanese patent application (No. 2020-101051) filed on Jun. 10, 2020 and Japanese patent application (No. 2020-161312) filed on Sep. 25, 2020.

The invention claimed is:

1. A heat-resistant member, comprising:
a glass sheet comprising a glass, and
a ceramic having a thermal conductivity of 25 Wm/K or more and bonded to the glass sheet by fluororesin bonding,
wherein
the glass comprises:
a composition comprising, by mole percent based on oxides,
52% to 80% of $SiO_2$,
5% to 30% of $B_2O_3$,
2% to 30% of $Al_2O_3$,
0.1% to 11% of $P_2O_5$, and
0.0001% to 5% of $Na_2O$, and
wherein the glass has an average thermal expansion coefficient $\alpha$ in a range of $5\times10^{-7}/^\circ$ C. to less than $33\times10^{-7}/^\circ$ C. at a temperature in a range of 50° C. to 350° C.

2. The heat-resistant member according to claim 1, wherein the composition of the glass, by mole percent based on oxides, includes 0.00001% to 0.03% of $Fe_2O_3$.

3. The heat-resistant member according to claim 1, wherein the composition of the glass, by mole percent based on oxides, includes 76.5% to 85% of $SiO_2+Al_2O_3$ and 0.01% to 5% of $R_2O$ provided that $R_2O$ is at least one of $Li_2O$ and $K_2O$.

4. The heat-resistant member according to claim 1, wherein the composition of the glass, by mole percent based on oxides, includes from 0.1% to 10% of MgO.

5. The heat-resistant member according to claim 1, wherein the composition of the glass, by mole percent based on oxides, includes 55% to 68% of $SiO_2$, and 8.5% to 30% of $Al_2O_3$, and a ratio of the content of $P_2O_5$ to the content of $Al_2O_3$, $P_2O_5/Al_2O_3$, by mole percent based on oxides, is from 0.1 to 1.0.

6. The heat-resistant member according to claim 1, wherein the composition of the glass, by mole percent based on oxides, includes 89% to 99% of $SiO_2+Al_2O_3+B_2O_3+P_2O_5$, and satisfies $(Al_2O_3+B_2O_3)/(SiO_2+P_2O_5)\geq0.3$, which is a ratio of a sum of the contents of $Al_2O_3$ and $B_2O_3$ to $SiO_2+P_2O_5$, by mole percent based on oxides.

7. The heat-resistant member according to claim 1, wherein the glass sheet has a sheet thickness in a range of 4 mm to 150 mm.

8. The heat-resistant member according to claim 1. wherein
the ceramic has a difference in expansion coefficient within a range of $\pm6.0\times10^{-7}/^\circ$ C. in a region of 50° C. to 200° C.

9. The heat-resistant member according to claim 1, wherein a linear transmittance $T_{850}$ of the glass is 90% or more when the glass has a glass sheet thickness of 15 mm.

10. The heat-resistant member according to claim 1, wherein the average thermal expansion coefficient $\alpha$ is in a range of $24\times10^{-7}/^\circ$ C. to less than $33\times10^{-7}/^\circ$ C. at a temperature in a range of 50° C. to 350° C.

11. The heat-resistant member according to claim 2, wherein a linear transmittance $T_{850}$ of the glass is 90% or more when the glass has a glass sheet thickness of 15 mm.

12. The heat-resistant member according to claim 2, wherein the average thermal expansion coefficient $\alpha$ is in a range of $24\times10^{-7}/^\circ$ C. to less than $33\times10^{-7}/^\circ$ C. at a temperature in a range of 50° C. to 350° C.

13. The heat-resistant member according to claim 3, wherein a linear transmittance $T_{850}$ of the glass is 90% or more when the glass bas a glass sheet thickness of 15 mm.

14. The heat-resistant member according to claim 3, wherein the average thermal expansion coefficient $\alpha$ is in a range of $24\times10^{-7}/^\circ$ C. to less than $33\times10^{-7}/^\circ$ C. at a temperature in a range of 50° C. to 350° C.

15. The heat-resistant member according to claim 2, wherein the composition of the glass, by mole percent based on oxides, includes 76.5% to 85% of $SiO_2+Al_2O_3$ and 0.01% to 5% of R2O provided that $R_2O$ is at least one of $Li_2O$ and $K_2O$.

16. The heat-resistant member according to claim 2, wherein the composition of the glass, by mole percent based on oxides, includes from 0.1% to 10% of MgO.

17. The heat-resistant member according to claim 1, wherein a linear transmittance $T_{850}$ of the glass is 87.5% or more when the glass has a glass sheet thickness of 15 mm.

18. The heat-resistant member according to claim 1, wherein the composition of the glass, by mole percent based on oxides, includes 0.1% to 3% of CaO.

19. The heat-resistant member according to claim 1, wherein the composition of the glass, by mole percent based on oxides, satisfies $(CaO+Na_2O+P_2O_5)/Al_2O_3\geq0.35$.

* * * * *